United States Patent [19]
Venkatesan

[11] Patent Number: 5,999,286
[45] Date of Patent: Dec. 7, 1999

[54] METHOD AND SYSTEM FOR RESTORING A DISTRIBUTED TELECOMMUNICATIONS NETWORK

[75] Inventor: S. Venkatesan, Plano, Tex.

[73] Assignee: Alcatel

[21] Appl. No.: 08/780,972

[22] Filed: Jan. 9, 1997

[51] Int. Cl.[6] .................................................. H04J 14/00
[52] U.S. Cl. ......................... 359/117; 340/827; 370/225
[58] Field of Search .................................. 359/117, 115, 359/158; 370/216, 221, 225, 228; 340/827, 825.14, 825.2

[56] References Cited

U.S. PATENT DOCUMENTS

| | | | |
|---|---|---|---|
| 4,677,614 | 6/1987 | Circo | 370/222 |
| 4,747,097 | 5/1988 | Ohya et al. | 370/222 |
| 5,093,824 | 3/1992 | Coan et al. | 370/228 |
| 5,235,599 | 8/1993 | Nishimura et al. | 370/218 X |
| 5,495,471 | 2/1996 | Chow et al. | 340/827 X |
| 5,604,729 | 2/1997 | Aoki et al. | 370/224 |

*Primary Examiner*—Thomas Mullen
*Attorney, Agent, or Firm*—Gary Cary Ware & Freidenrich LLP

[57] ABSTRACT

This invention includes a path-based method and system that restore a distributed telecommunications network (90) from a failure condition (92). First, the method and system notify all the network nodes (22, 24, 26, 28) of the fault of a link (12). Next, an alternate route finding phase occurs for finding alternate paths (S-T1-T4-D) to reroute the disrupted traffic. For finding alternate paths (S-T1-T4-D), the alternate route finding phase includes sending messages (70, 100) throughout the distributed telecommunications network. Upon finding some alternate paths (S-T1-T4-D), the method and system send connect commands (100) to make the necessary cross connections in the distributed telecommunications network nodes (22, 24, 26, 28) that are on the alternate paths (S-T1-T4-D). Throughout the distributed network restoration process, the method and system synchronize (62) the distributed telecommunications network nodes to avoid possible race conditions among the nodes.

20 Claims, 6 Drawing Sheets

METHOD AND SYSTEM FOR RESTORING A DISTRIBUTED TELECOMMUNICATIONS NETWORK

TECHNICAL FIELD OF THE INVENTION

The present invention relates to telecommunications methods and systems that include distributed network cross connects and, more particularly, to a method and system for restoring a distributed telecommunications network and, even more particularly, to a method and system that allows cooperating digital cross connect switches to reroute traffic from one path to another when a link or a node in an original path fails.

BACKGROUND OF THE INVENTION

With the widespread deployment of fiber optic transmission systems and the alarming rate of outages due to fiber cuts, there is great interest in improving the process of restoring disrupted traffic from minutes to sub-seconds following a fiber or span cut. Automatic protection switching probably is the fastest technique and can switch the disrupted traffic to dedicated spare links in under 50 milliseconds. However, it also requires high dedicated spare channel capacity. With recent advances in digital cross connect systems (DCS), there is increasing interest in using DCS in network restoration.

There are two basic approaches to reroute the disrupted traffic due to a fiber span cut. The link restoration approach replaces the affected link segment of a disrupted channel by a spare path between the two disrupted ends. The path restoration approach releases each disrupted channel and lets the source and destination end of the channel re-establish the connection. With the additional release phase the path restoration approach takes more time than the link restoration. However, the path restoration approach can find more efficient spare paths with fewer link segments and can handle the node failure situation with the same logic. The link restoration approach has applications in achieving fast network restoration.

A well-known distributed network restoration method for a DCS-based fiber network was proposed by W. D.

Grover in "The Self-Healing Network: A Fast Distributed Restoration Technique For Networks Using Digital Cross-Connect Machines", Proc. GLOBECOM '87, pp. 28.2.1–28.2.6, 1987 and detailed in his 1989 Ph.D. dissertation for the Department of Electrical Engineering at University of Alberta entitled, "Self Healing Networks: A Distributed Algorithm For K-Shortest Link-Disjoint Paths In A Multi-Graph With Applications In Real Time Network Restoration." The protocol associated with that process is called the Self-Healing Network (SHN) protocol.

Another distributed network restoration process for DCS-based fiber networks has been proposed by Yang and Hasegawa in "FITNESS: Failure Immunization Technology for Network Survivability," Proc. of GLOBECOM '88, pp. 47.3.1–47.3.6, November 1988. This method became known as Bellcore's FITNESS approach RREACT is another distributed approach to network restoration and is described in detail in "RREACT: A Distributed Protocol for Rapid Restoration of Active Communication Trunks", UCCS Tech Report EAS-CS-92-18, November 1992.

The above approaches are not sufficient as they appear to be unstable and result in an explosion of messages throughout the network following the failure of a network link or node. These approaches also rely upon extensive knowledge of the network topology prior to the failure. Unfortunately, the information could be out of date at the time of the failure, especially in the situation of a multiple link failure. The complexity, instability, and unreliability make these approaches unsatisfactory for many types of distributed telecommunications networks.

SUMMARY OF THE INVENTION

In light of the above limitations, there is a need for a method and system to allow cooperating digital cross connect switches to reroute disrupted traffic from one path to another when a link or a node in the original path fails.

A need also exists for a method and system for cross connects of a distributed telecommunications network to explore the network topology, determine an alternate path through the network to restore traffic around a failed link or node, and to restore the failed traffic to a new path.

In accordance with the present invention, a method and system for restoring a distributed telecommunications network is provided that substantially eliminates or reduces disadvantages and problems associated with previously developed network restoration or recovery methods and system.

In one aspect of the present invention, a distributed telecommunications network restoration process is provided that includes a step of detecting the failure of a link and notifying at least all neighboring network nodes of the fault. Next, the alternate route finding phase finds alternate paths to reroute the disrupted telecommunications network traffic. This step involves sending messages throughout the network to find possible alternate paths. Once the process finds some alternate paths, the present invention issues to make the necessary cross connections in the nodes that are on the alternate paths. To avoid race conditions during the process, the present invention synchronizes the distributed telecommunications network nodes. This feature includes passing messages between the network nodes to controlled message exchanges occurring between the nodes. However, the process only generates one message for each group of failed paths between the "controlling" nodes, rather than one message per path.

A technical advantage of the present invention is that it operates significantly faster and restores traffic in a given distributed telecommunications network more completely than do other message flooding or other types of traffic restoration or recovery processes.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein.

DETAILED DESCRIPTION OF THE INVENTION

Preferred embodiments of the present invention are illustrated in the FIGURES like numerals being used to refer to like and corresponding parts of the various drawings.

Figure 1:
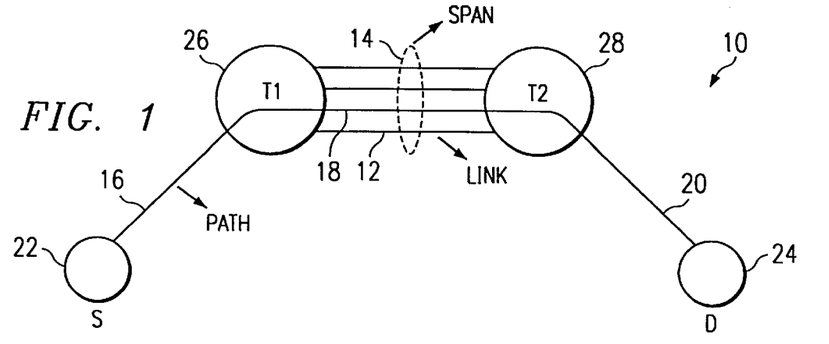
FIG. 1 illustrates the meaning of and contexts of selected terms relating to the present invention.

FIG. 1 illustrates an example of a distributed telecommunications network 10 for defining terms relating to the present invention. In FIG. 1, the telecommunications network is generally labelled with reference numeral 10 and includes link 12 which is a connection that supports bi-directional signals, such as that of a DS3 system existing between two adjacent nodes. Span 14 represents a set of all links between two adjacent nodes. Path 16 describes a series of links of a given distributed telecommunications network. A route is a set of paths that go through the same sequence of nodes, such as paths 16, 18 and 20. A source node 22 provides a label for the end node of a failed path with a smaller node identifier than the other end nodes of the failed path. A destination node 24 may refer to the end node of a failed path with a larger node identifier than the other end nodes. Tandem nodes 26 and 28 are nodes that are neither a source node 22 nor a destination node 24 for a failed path. The term "hop count sequence" defines a sequence that specifies the hop count limit for each iteration of the process of the present invention.

The present invention provides a process that a control system for a distributed telecommunications network may employ for restoring communication between nodes that terminate in a failed link.

Distributed telecommunications network 10 may be a high-speed transport system, such as the Synchronous Optical Network (SONET) prescribed by American National Standard, ANSI T1.105-1988, "Digital Hierarchy Optical Interface Rates and Formats Specification," Mar. 10, 1988. Such a network may normally be a fiber optic arrangement comprising broadband digital cross connect systems that connect network links at the STS-1 level (Synchronous Transport Signal level 1, 51.84M bit/s). Since the network will frequently be used in applications, such as broadband ISDN applications, requiring multiple STS-1 bands, it is of particular technical advantage that the present invention includes the process and the system for implementing the process of locating and restoring a telecommunications path, having the maximum traffic flow to thereby economically restore disrupted service.

The present invention uses information that distributed telecommunications network 10 knows at the time of a node failure or link failure. The knowledge that distributed telecommunications network 10 knows relating to each node before a failure includes the node identifier and type of each node (e.g., working, spare, or access/egress nodes). Distributed telecommunications network 10 also knows which is the far end or destination node identifier of each path. Distributed telecommunications network 10 holds this information in a "keep alive message." The destination node identifier of each access/egress port, is also known by the network.

Restoring distributed telecommunications network 10 following a failure using the process of the invention may make use of, for example, embedded SONET overhead channels to conveniently provide the communication of the below-described messages. Using these messages, the present invention permits exchanges between nodes to guide the necessary alternate path or paths between the source nodes 22 and destination nodes 24 to restore the disrupted telecommunications traffic.

The failure between a source node 22 and a destination node 24 may be due to a span cut, for example. Once the two end nodes of a failed route 16, 18, 20 detect a failure, the node with smallest node identifier assumes the role of source node 22 and the node with the largest node identifier becomes destination node 24. Source node 22 and destination node 24 then send a failure message to all of their neighbors.

Figure 2:
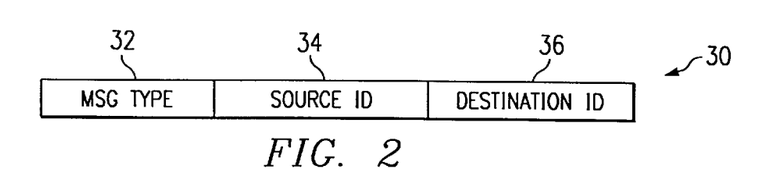
FIG. 2 provides the format of a failure message that the present invention may use.

FIG. 2 provides the format of a failure message 30. On receiving failure message 30, a tandem node forwards the message to all of its neighboring nodes except for the neighboring node which sent the failure message 30. After receiving failure message 30, the source node 22 initiates the next process of the present invention.

With the present invention, a node may receive several failure messages 30 relating to a particular source node-destination node pair. The receiving node forwards only the first failure message 30 it receives and ignores others coming afterward. If the node receives a failure message 30 for some other source node-destination node pair, the node forwards the failure message 30 that it first received to the later-transmitting source-destination pair.

Figure 3:
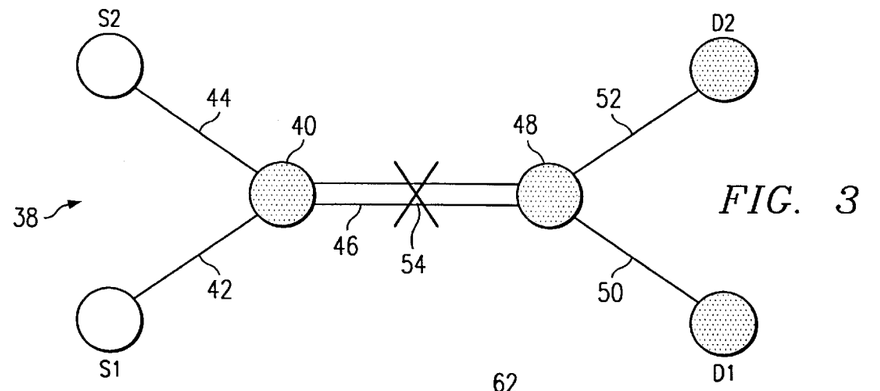
FIG. 3 depicts the failure of a distributed telecommunications network span between tandem nodes, T1 and T2, for which the present invention creates multiple source destination pairs, S1-D1 and S2-D2.

Note that with the present invention, there may be more than one source node-destination node pair due to a single span cut. FIG. 3 shows this possible situation for network portion 38. In FIG. 3, source nodes, S1 and S2, feed to tandem node 40 via paths 42 and 44, respectively. Span 46 connects tandem node 40 to tandem node 48. Tandem node 48 connects via paths 50 and 52 to destination nodes, D1 and D2, respectively. Span cut 54 represents a failure in span 46 between tandem nodes 40 and 48. Each node keeps a count of the number of source node-destination node pairs based on the distinct failure messages 30 which the node has received. This failure message 30 count is useful to later terminate the process of the present invention.

The process of the present invention uses nodes that are "loosely synchronized." Synchronizing the nodes prevents race conditions and helps each node to determine the termination of each phase of the process. Each node maintains a step counter. The nodes use a special message, a step completed message, for synchronization. The step completed message may contain only a type field which indicates that it is a step completed message.

Figure 4:
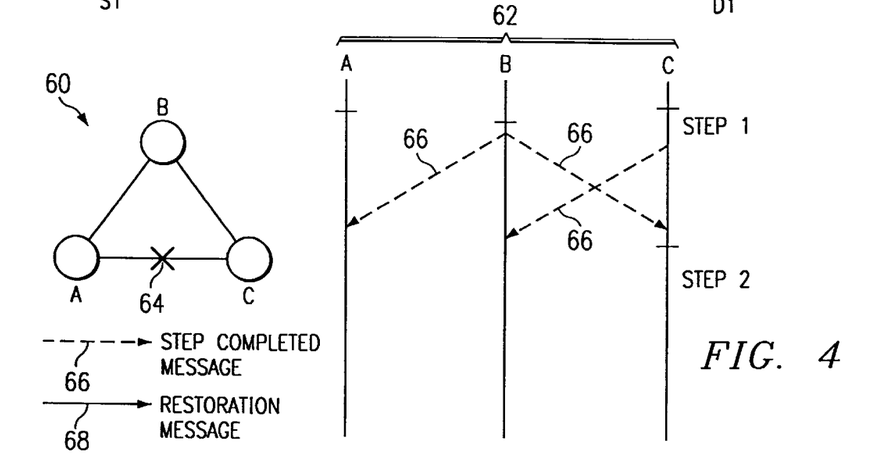
FIGS. 4 and 5 show a three-node network describing the message exchanges occurring during the synchronizing steps of the present invention.
Figure 5:
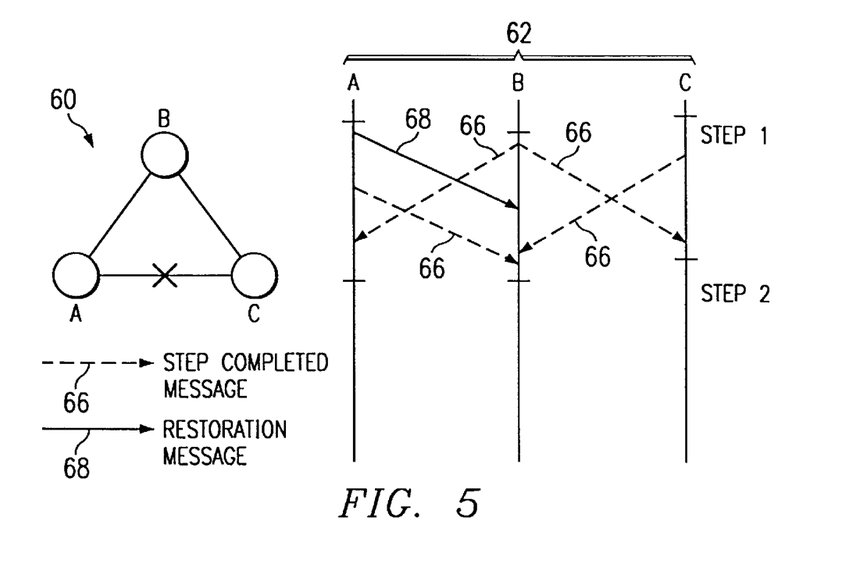

FIGS. 4 and 5 aid in understanding the synchronization process of the present invention. FIGS. 4 and 5 include network portion 60 and lines 62 that correspond to nodes A, B, and C, as well as dashed-line step completed messages 66 and solid-line restoration message 68. During a step, a node may need to perform some action. The action that a node is to perform may be to process the restoration messages 68 it previously received during the previous step and forward the restoration messages 68 to its neighbors. Once the node performs all the actions for current step, the node then sends a step completed message 66 to each of its neighbors.

If the node receives any restoration messages 68 from any neighboring nodes, the node stores the messages to process them during the next step. The node then waits for step completed messages from all of its neighbors. After receiving step completed messages 66 from all neighboring nodes, the node increments the step counter to proceed to the next step. The above rules keep the nodes loosely synchronized. Note that a node will not proceed to the next step unless all neighboring nodes are "ready" to proceed to the next step.

Focusing more on FIGS. 4 and 5, consider network portion 60 which includes nodes A, B, and C. Lines 62 include line A that corresponds to node A, line B that corresponds to node B, and line C that corresponds to node C. Span cut 64 depicts a span cut between node A and node C.

A node begins the synchronizing process of the present invention once the node learns about a failure. The initial value of step counter is 0. A node resets its associated step counter to 0 when the restoration process terminates. Node A, therefore, may be labeled a source node 22, and node C may be labeled a destination node 24. Each node starts synchronizing once it receives a failure message (see FIG. 6). Restoration will be initiated by source node A by sending restoration messages 68. Destination node C has no restoration message 68 to send, so it just sends a step completed message 66 (a synchronization message) to tandem node B (its only neighbor) and waits for a step completed message 66 from tandem node B.

Tandem node B has no restoration message 68 to send, so it just sends step completed message 66 to both neighboring nodes A and C. After receiving a step completed message from tandem node B, destination node C proceeds to its next step. Tandem node B does not proceed to its next step since it has not received a step completed message 66 from source node A.

Since source node A is a source node, it initiates the restoration by sending a restoration message 68 to tandem node B and then it sends a step completed message, as FIG. 5 indicates. Tandem node B proceeds to the next step once it receives a step completed message 66 from node A. Tandem node B will process the restoration message 68 in Step 2. Those types of synchronizing steps continue throughout the process of the present invention. An important property of the synchronization steps of the present invention, therefore, is that a restoration message 68 takes one step to travel one hop. A next phase of the method of the present invention involves finding an alternate route for the disrupted telecommunications traffic. This phase proceeds in iterations. In each iteration, the present invention finds alternate routes of a specified hop count limit between each source node 22 and the corresponding destination node. At the end of an iteration, if there is a source node 22 and destination node between which the present invention has not fully restored traffic, the process continues to the next iteration with an increased hop count limit. Otherwise the process terminates.

An iteration consists of three phases: (1) an explore phase, (2) a return phase, (3) a maximum flow process execution phase. In the explore phase, the present invention sends explore messages (FIG. 6) from source nodes 22 and forwarded by tandem nodes 26 to explore the availability of the alternate spare routes. An explore phase, therefore, is initiated by the source nodes 22. The return phase is initiated by destination nodes 24 which send return messages (FIG. 10) in response to the explore messages received by them. A return message traverses the route traversed by its corresponding explore message in the reverse direction. The return messages confirm the availability of spare routes. At the end of return phase a source node 22 constructs a model of a subnetwork with spare capacities-based on the information from the return messages it received-and then executes a maximum flow process to find alternate routes providing the maximum flow for the communications traffic.

For every iteration, there is a corresponding hop count limit. The hop count limit specifies the number of hops the explore messages will travel in explore phase. Let "h" be the hop count limit for the current iteration, for example. Then the explore messages travels at most "h" hops in this iteration. Since each restoration message takes one step to travel a hop, the explore phase of this iteration takes "h" steps. The return phase also takes "h" steps.

Source nodes 22 initiate the explore phase of the present invention. The explore phase of the first iteration begins immediately after a node learns about a failure. Each node knows exactly when the subsequent explore phases begin using the above-described synchronization steps.

Figure 6:
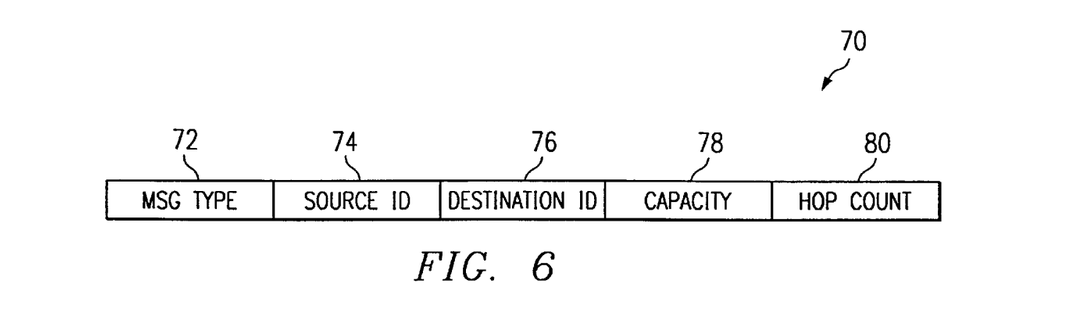
FIG. 6 provides the format of an explore message that the present invention may use.

FIG. 6 provides the format of an explore message 70. Explore message 70 includes "msg type" field 72 to indicate that the message is an explore message. "Source node id" field 74 contains the identifier for the source node of the disrupted route. "Destination node id" field 76 contains the disrupted route's destination node identifier. "Capacity" field 78 specifies the capacity of DS3's, for example, that the alternate route requires. Information in "hop count" field 80 is filled by source node 22 to record the hop count limit of the current iteration. A source node 22 creates an explore message 70 and sends it on each span 46 having some spare capacity.

Figure 7:
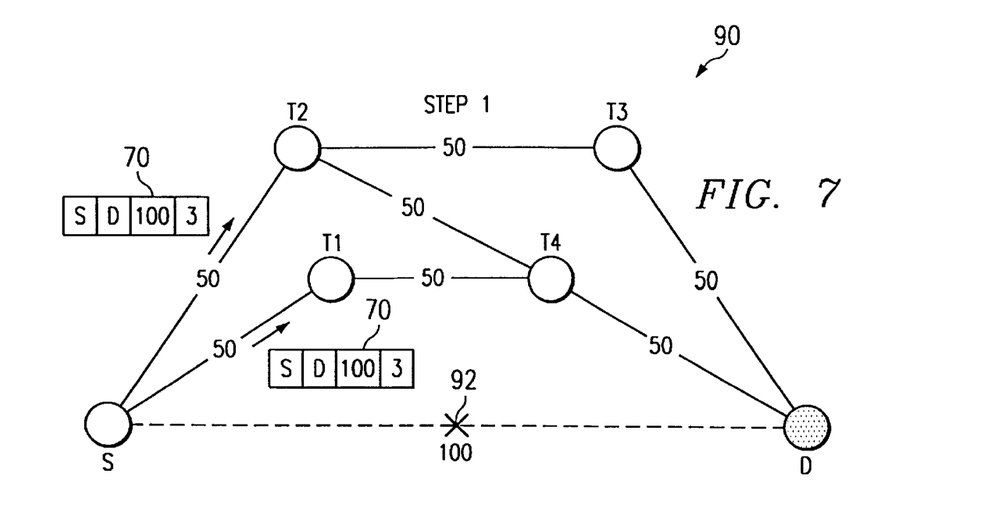
FIG. 7 is a conceptual illustration of a source node, S, sending explore messages to neighboring tandem nodes, T1 and T2.

FIG. 7 helps to explain how the present invention operates by conceptually illustrating a distributed telecommunication network 90 that includes a source node, S, sending explore message 70 to neighboring tandem nodes T1 and T2. The traffic (100 units) between source node, S, and destination node, D, is disrupted due to span cut 92. During Step 1 (i.e. the first iteration) source node, S, forms an explore message 70 and sends it to both neighboring tandem nodes, T1 and T2. Note that the "msg type" field 72 is not shown in the explore messages 70 of FIGS. 7 through 9, for simplicity. During Step 1, all other nodes do not send any restoration messages. These nodes will send step completed messages to their neighbors, but these are also not shown in FIG. 7 for the sake of simplicity After sending the explore messages 70, source node, S, sends a step completed message to its neighboring tandem nodes, T1 and T2.

A node on receiving an explore message 70 compares its own node identifier with the "destination id" field 76 contents of the explore message 70. If these identifier values do not match, then the receiving and comparing node determines itself to be a tandem node.

In general, the role of a tandem node 26 during an explore phase is to receive an explore message 70, decrement "hop count" field 80, and then forward the explore message 70 to all neighboring nodes other than the neighboring node that sent this message. However, the explore message 70 may not be forwarded if either of the following holds: (1) the hop count of the incoming explore message 70 is 1, or (2) the explore message 70 received is not the first explore message 70 received for a particular source node-destination node pair. In this case, the explore message 70 is stored and used during the return phase.

Figure 8:
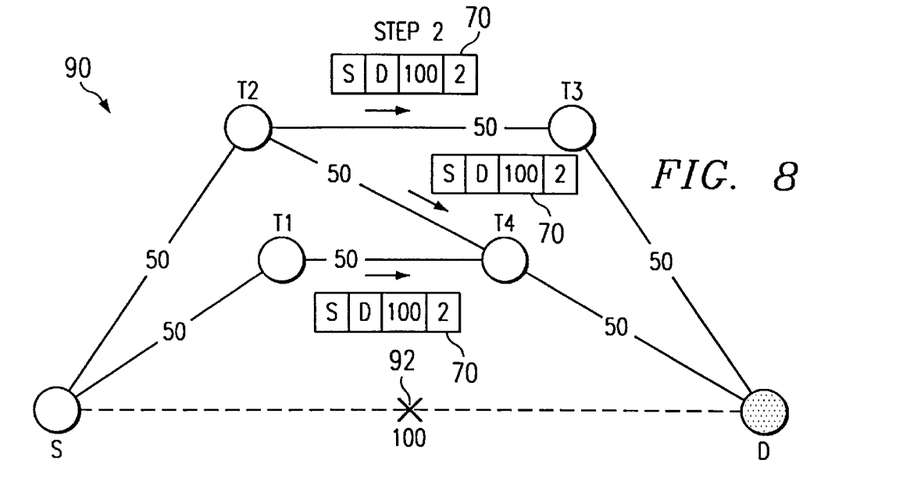
FIGS. 8 and 9 describe actions taken by tandem nodes, T1 through T4, upon receiving an explore message.
Figure 9:
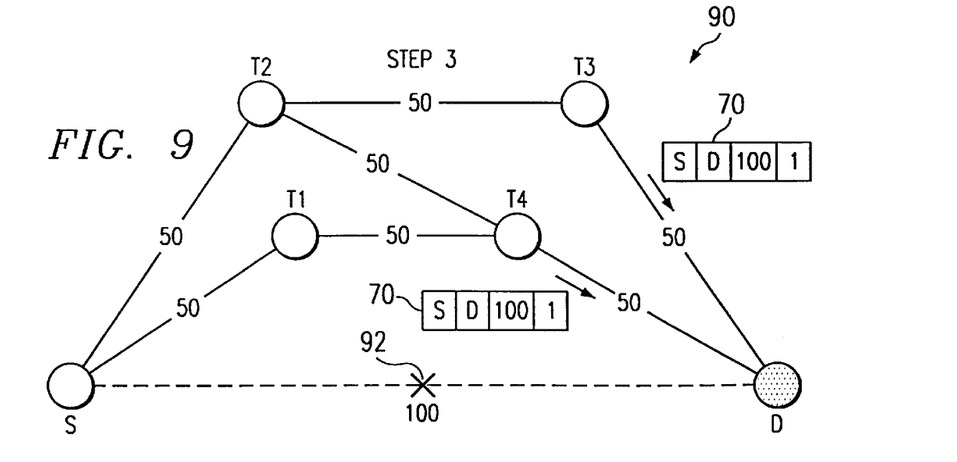

FIGS. 8 and 9, respectively, describe Steps 2 and 3 which tandem nodes, T1 through T4, take after receiving an explore message 70. Considering the example shown in FIG. 7, tandem nodes, T1 and T2, receive the explore messages 70 that the source node, S, sends. Tandem node T1 forwards the explore message 70 to tandem node T4, after decrementing the "hop count" field 80 value of the received explore message 70. Similarly, tandem node, T2, forwards the explore message 70 to its neighboring tandem nodes, T3 and T4.

During Step 2 of FIG. 8, tandem node, T4, receives two explore messages 70 for the source node-destination node pair, S-D. Tandem node, T4, then forwards only one of them in Step 3, which FIG. 9 describes.

A node determines that it is a destination node 24 for an explore message 70 by comparing its node identifier with the "destination id" field value of the explore message 70. If there is a match, then the node that matches is the destination node 24 for this message. A destination node 24 simply stores all the explore messages 70 it receives. The destination node responds to the explore messages 70 during the return phase by sending return messages back through the tandem nodes 26 to the source nodes 22.

The destination node 24 initiates the return phase of the process of the present invention. The return phase starts "h" steps after the beginning of the iteration, where "h" is the hop count limit for the current iteration. Since each node knows which step it is based on the hop count, the destination node 24 can begin the return phase during the "h+1$^{th}$" step of the current iteration.

Figure 10:
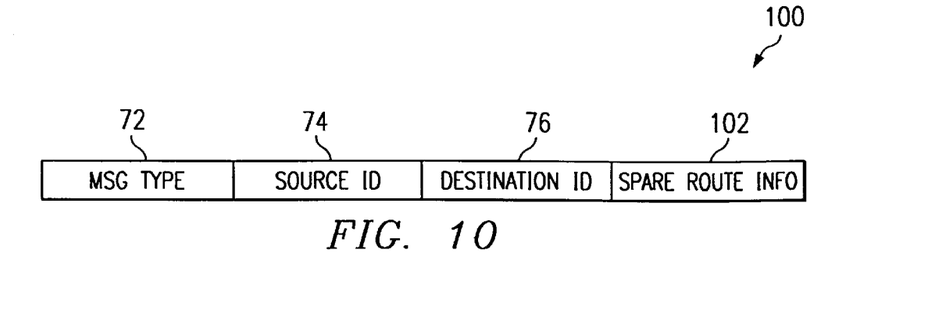
FIG. 10 provides the format of the return message that the present invention may use.

For each explore message 70 received, a destination node 24 sends a return message to the neighbor who sent the explore message. FIG. 10 provides the format of return message 100. The "msg type" field 72, "source id" field 74, and "destination id" field 76 function as described above. The "spare route info" field 102 of return message 100 contains the topological information about a spare route from the source to destination and about the spare capacity available on the spare route. The tandem nodes, T1 through T4, append information to the "spare route info" field 102. A destination node 24 creates a return message 100 for each explore message 70 it previously received during the explore phase. The destination fills "spare route info" field 102 with the destination node 24 identifier. The destination node 24 then sends the return message 100 to the neighboring node which previously sent the corresponding explore message 70.

Figure 11:
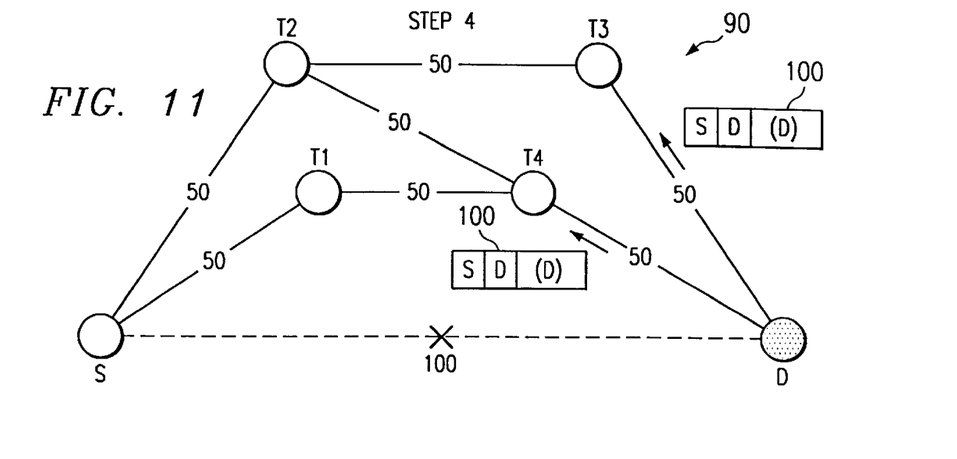
FIG. 11 shows conceptually the actions taken by a destination node, D, in generating a restore message after receiving an explore message.

Referring now to FIG. 11, and continuing with the example of FIG. 9, the return phase begins in Step 4 which includes the response of the destination node, D, to the explore messages 70 it previously received. In the return phase, a tandem node 26 receives a return message 100 on a span only if it had sent a corresponding explore message 70 on that span during the explore phase. On receiving a return message, a tandem node allocates spare capacity on that span to the corresponding source-destination.

Figure 12:
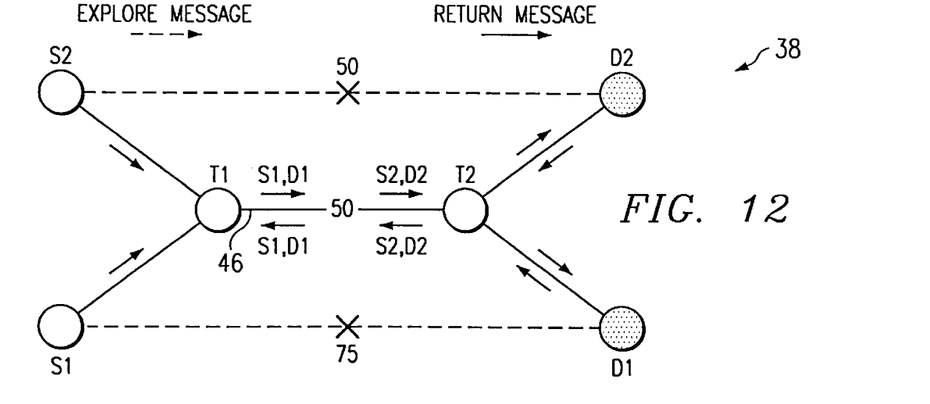
FIG. 12 depicts how the present invention handles contentions for spare capacity throughout a distributed telecommunications network.

Note here, also, that there may be several source node destination node pairs contending for spare capacities on a given span. In FIG. 12, for example, the source node-destination node pairs, S1-D1 and S2-D2, contend for spare capacity in span 46 between tandem nodes, T1 and T2. At the end of the explore phase the tandem nodes, T1 and T2, know exactly which source node-destination node pairs contend for spare capacity on that span 46. During the return phase the tandem nodes, T1 and T2, allocate capacity for a source node-destination node pair based on a contention resolution rule. One such rule is to allocate the spare capacity evenly to the contending source node destination node pairs. Using this rule, tandem node, T1, allocates 25 units to the pair source node-destination node, S1-D1, and 25 units to the source node destination node pair, S2-D2, on the span 46 between tandem nodes, T1 and T2.

Continuing further in the return phase, each tandem node, T1 and T2, appends its node identifier and the amount of spares allocated to "spare route info" field 102 of the return message 100 and forwards it on the span 46 on which it received the corresponding explore message 70 first. The tandem node might have received explore messages 70 for the same source node-destination node pair on other spans 46 too. On those spans 46 it sends a return message 100 with "spare route info" field 102 containing only its node identifier.

Figure 13:
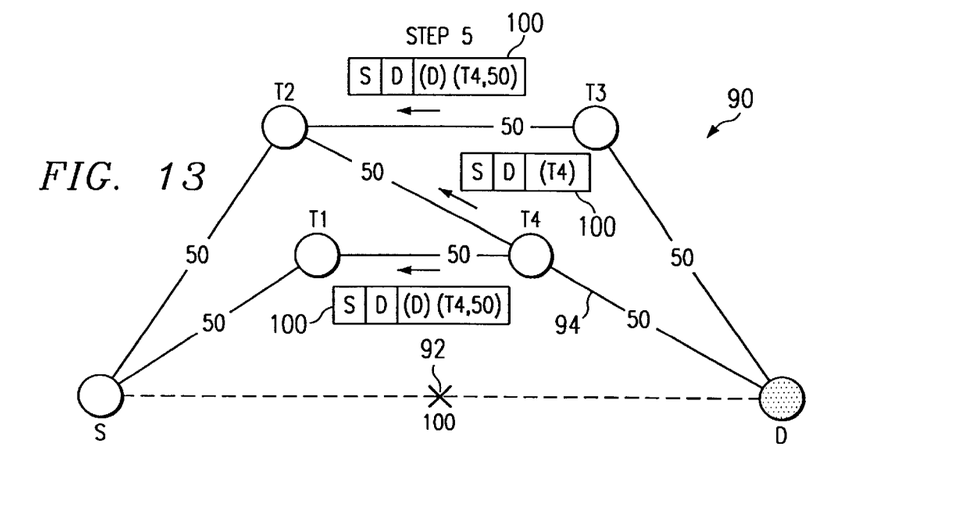
FIG. 13 describes actions taken by tandem nodes, T1 through T4, upon receiving a return message.

In FIG. 13, tandem node, T4, allocates 50 units of spare capacity on the span 94 between tandem node T4 and destination node D. It appends the parameter values (T4,50) to the return message 100 and sends return message 100 to tandem nodes T1. Tandem node, T4, also sends a return message 100 to tandem node, T2, since it also received an explore message from tandem node T2, with "spare route info" field 102 containing the parameter value, (T4).

Figure 14:
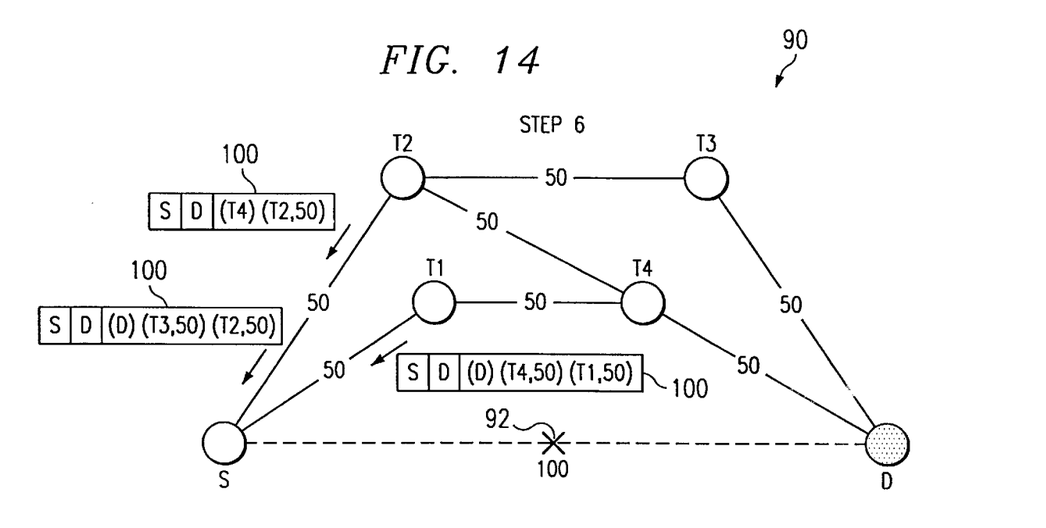
FIG. 14 shows a last step of the return phase of the present invention.

FIG. 14 shows a last step of the return phase. A source node 22 may receive a return message 100 at any step during the return phase. The source node 22 can easily detect that it is the source node for the return message 100 by looking at the "source id" field 74 of the return message 100. If the source node 22 is the source node for the return message 100, the source node 22 first allocates the spare capacity for the message on the span on which the message arrived using the contention resolution rule.

The "spare route info" field 102 contains information about a spare route from the source node to destination node and the amount of spare capacity available on the spans that make up the spare route. Based on all of the return messages 100 received, the source node constructs a subnetwork with spare capacities. A source node 22 waits for the return phase to complete and proceed to the maxflow execution. Due to synchronization, the source node knows when the return phase will be complete.

Figure 15:
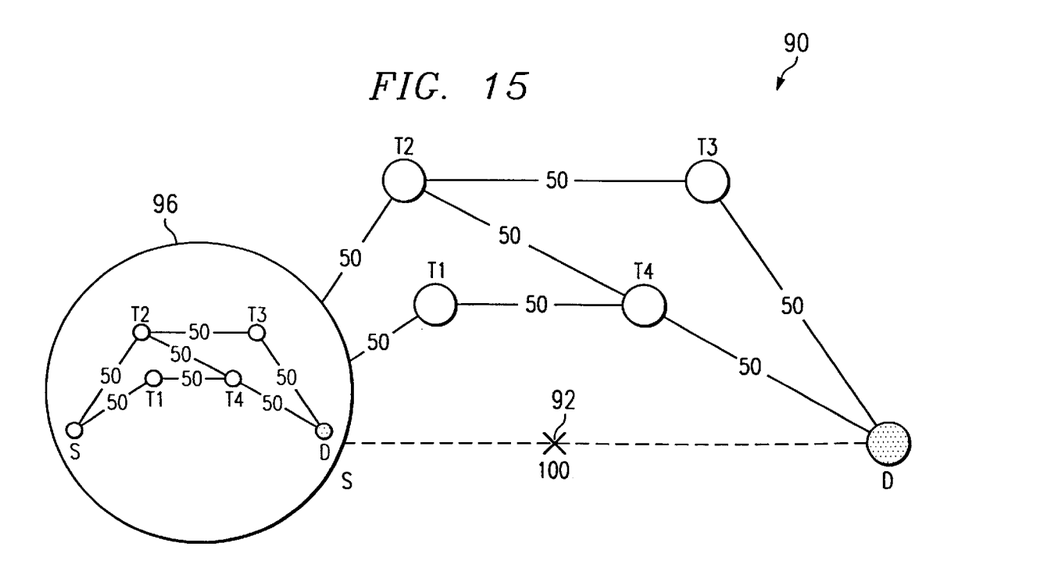
FIG. 15 illustrates the subnetwork that a source node, S, may construct in performing the process of the present invention.

At the end of the return phase, a source node 22 would have constructed an alternate route within the network complete with spare capacities based on the return messages it receives. FIG. 15, therefore, shows set 96 of alternate routes for distributing the disrupted communications traffic.

The source node 22 may, now that it holds alternate route set 96 of possible alternate paths, perform a maximum flow process to maximize the amount of traffic that can be restored. Examples of maximum flow processes appear in T. H. Cormen, et al, "Introduction to Algorithms" (The MIT Press, 1990); and J. E. Baker, "Distributed Link Restoration with Robust Planning," Proc. GLOBACOM '91, pp. 306–311, December 1991.) These publications illustrate ways to determine all the disjoint paths with the maximum flow between two disrupted nodes. Another efficient distributed maximum flow algorithm is described by Goldberg and Tarjan in "A New Approach to the Maximum-Flow Problem," Jour. Assoc. Comp. Mach., Vol. 35, No. 4, pp. 921–940, October 1988. With the present invention, a wide variety of maximum flow processes may be used to generate a maximum traffic flow path.

The distributed telecommunications network alternate paths that the present invention constructs begin from source node, S, following the completion of the return phase, as shown in FIG. 15. Source node S executes the results of the maximum flow determination process and the alternate routes discovered as appears in FIG. 16. The alternate route of FIG. 16 restores 100 units of traffic. Using a maximum flow process assures that the amount of traffic that the present invention restores in the alternate route or subnetwork that the present invention generates will be maximum possible for the given network and traffic conditions.

On the other hand, if a source node 22 has not restored traffic completely at the end of the maximum flow process execution, the method of the present invention proceeds to a next iteration. The method also sends connect messages to the other nodes to make the required cross connections.

Figure 16:
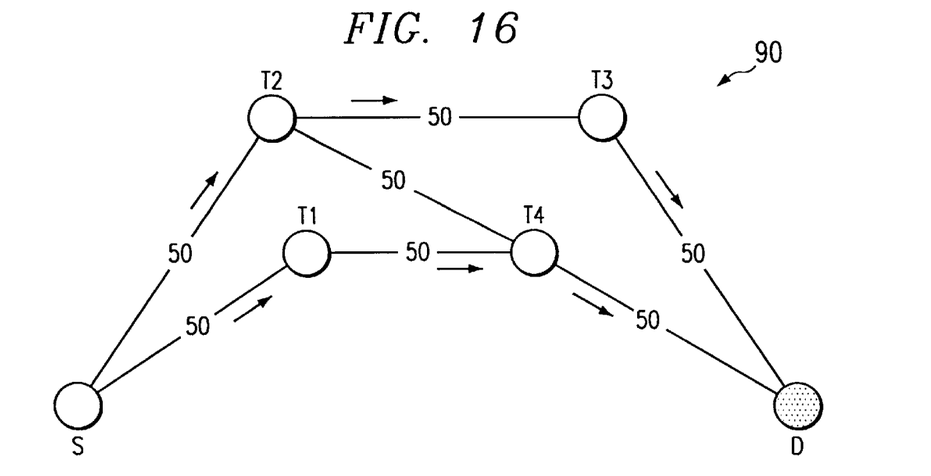
FIG. 16 shows alternate routes that the present invention may select in executing a maximum flow process.

At the end of the maximum flow process, the present invention should have generated several alternate routes for communications traffic flow. As shown in FIG. 16, first an alternate route, S-T1-T4-D, with capacity 50 may be found. Next, another route, S-T2-T3-D, with capacity 50 may be found. As and when an alternate route is found a connect message is created and sent.

Figure 17:
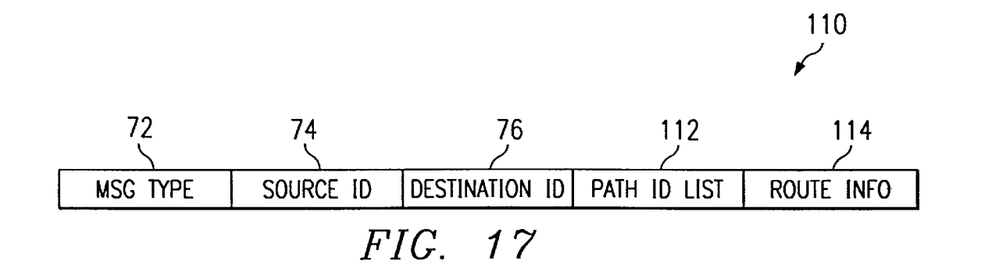
FIG. 17 provides the format of a connect message that the present invention may use to establish alternate paths for the disrupted traffic.

FIG. 17 provides the format of connect message 110 The "msg type" field 72, "source id" field 74, and "destination id" field 76 function as described above. The "path id list" field 112 provides a list of path identifiers that will be rolled to a particular alternate route. The "route info" field 114 contains the route information for the particular alternate path.

Figure 18:
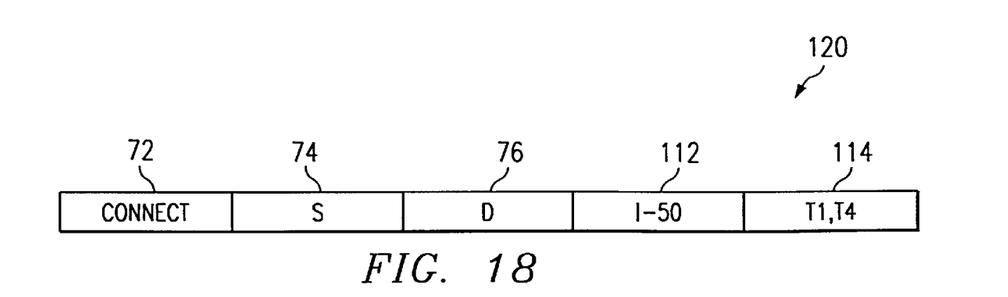
FIG. 18 provides the connect message for the alternate route (S-T1-T4-D) with a predetermined capacity.

FIG. 18 provides an example of the connect message 120 for the alternate route, S-T1-T4-D, with capacity of 50 units, for example. Source node, S, sends the connect message 120 to the next node in the alternate route which is tandem node, T1. Tandem node, T1, issues the command to make necessary cross connections and forwards the message to tandem node, T4. The connect message 120 travels the chosen alternate path and finally reaches its destination node, D.

With the preferred embodiment, there are two events that can terminate the network restoration process at a node. First, the process will terminate once the last iteration completes. If all the paths were restored much before the last iteration, the process can be terminated early, except for the requirement of sending "alive" messages to the system.

Figure 19:
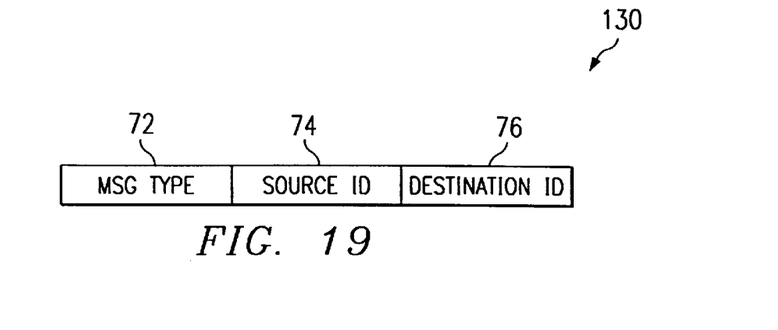
FIG. 19 provides the format for the path restored message upon completing the restoration process of the present invention.

Each source node 22 sends a path restored message once it has restored all the failed paths. FIG. 19 provides the format for the path restored message 130. The fields of path restored message 130 include "msg type" field 72, "source id" field 74, and "destination id" field 76, all of which have been described above, the destination now being the contents of these fields designating the path restored message as such. If a node receives path restored messages from all the source node-destination node pairs for which it has received failure message 30, this properly terminates the present method and system.

Although the invention has been described in detail herein with reference to the illustrative embodiments, it is to be understood that this description is by way of example only and is not to be construed in a limiting sense. It is to be further understood, therefore, that numerous changes in the details of the embodiments of the invention and additional embodiments of the invention will be apparent to and may be made by persons of ordinary skill in the art having reference to this description. It is contemplated that all such changes and additional embodiments are within the spirit and true scope of the invention as claimed below.

What is claimed is:

1. A method for restoring a distributed telecommunications network by re-routing traffic from one path to another when a link or a node in an original path fails, comprising the steps of:

notifying nodes neighboring said failed link of the distributed telecommunications network of the failure of the link;

determining a plurality of alternate paths for rerouting the disrupted traffic by sending a plurality of messages throughout the distributed telecommunications network;

issuing to a control mechanism a plurality of connect commands for making cross connections to nodes on selected ones of the alternate paths; and synchronizing the nodes of the alternate paths for connecting the nodes along the selected ones of the alternate paths.

2. The method of claim 1, wherein said notifying step further comprises the step of sending at least one failure message to said neighboring nodes.

3. The method of claim 1, wherein said determining step further comprises the step of sending a plurality of explore messages throughout said distributed telecommunications network for exploring possible alternate paths for rerouting the disrupted traffic.

4. The method of claim 1, wherein said determining step further comprises the step of sending a plurality of return messages throughout said distributed telecommunications network for reporting a possible alternate path for rerouting the disrupted traffic.

5. The method of claim 1, wherein said determining step further comprises the step of executing a maximum flow process for determining at least maximum flow alternate path through said distributed telecommunications network.

6. The method of claim 1, wherein said issuing step further comprises the step of issuing a plurality of connect commands, said connect commands comprising data relating to source node and a destination node together with data relating to a data path and a route of tandem nodes between said source node and said destination node.

7. The method of claim 1, wherein said synchronizing step further comprises the step of first generating at least one step completed message from at least a destination node followed by generating a restoration message and a step completed message from a source node.

8. A distributed telecommunications network having the ability to restore a distributed telecommunications network by rerouting traffic from one path to another when a link or a node in an original path fails, said distributed telecommunications network comprising:

a plurality of nodes for routing telecommunications traffic;

a plurality of links for establishing a path connecting selected ones of said plurality of nodes;

said nodes comprising a set of network restoring instructions and circuitry for executing said network restoring instructions, said network restoring instructions comprising:

instructions for notifying nodes neighboring said failed link of the distributed telecommunications network of the failure of the link;

instructions for determining a plurality of alternate paths for rerouting the disrupted traffic by sending a plurality of messages throughout the distributed telecommunications network;

instructions for issuing to a control mechanism a plurality of connect commands for making cross connections to nodes on selected ones of the alternate paths; and instructions for synchronizing the nodes of the alternate paths for connecting the nodes along the selected ones of the alternate paths.

9. The distributed telecommunications network of claim 8, wherein said notifying instructions further comprise instructions for sending at least one failure message to said neighboring nodes.

10. The distributed telecommunications network of claim 8, wherein said determining instructions further comprise the instructions for sending a plurality of explore messages throughout said distributed telecommunications network for exploring possible alternate paths for rerouting the disrupted traffic.

11. The distributed telecommunications network of claim 8, wherein said determining instructions further comprise the instructions for sending a plurality of return messages throughout said distributed telecommunications network for reporting a possible alternate path for rerouting the disrupted traffic.

12. The distributed telecommunications network of claim 8, wherein said determining instructions further comprise the instructions for executing a maximum flow process for determining at least maximum flow alternate path through said distributed telecommunications network.

13. The distributed telecommunications network of claim 8, wherein said issuing instructions further comprise the instructions for issuing a plurality of connect commands, said connect commands comprising a data relating to source node and a destination node together with data relating to a data path and a route of tandem nodes between said source node and said destination node.

14. The distributed telecommunications network of claim 8, wherein said synchronizing instructions further comprise the instructions for first generating at least one step completed message from at least a destination node followed by generating a restoration message and a step completed message from a source node.

15. A method for forming a distributed telecommunications network having the ability to reroute traffic from one path to another when a link or a node in an original path fails, said distributed telecommunications network forming method comprising the steps of:

forming a plurality of nodes for routing telecommunications traffic;

forming a plurality of links for establishing a path connecting selected ones of said plurality of nodes; and forming said plurality of nodes to comprise a set of network restoring instructions and circuitry for executing said network restoring instructions, said network restoring instructions formed by the steps of:

forming instructions for notifying nodes neighboring said failed link of the distributed telecommunications network of the failure of the link;

forming instructions for determining a plurality of alternate paths for re-routing the disrupted traffic by sending a plurality of messages throughout the distributed telecommunications network;

forming instructions for issuing to a control mechanism a plurality of connect commands for making cross connections to nodes on selected ones of the alternate paths; and forming instructions for synchronizing the nodes of alternate paths for connecting the nodes along the selected ones of the alternate paths.

16. The method of claim 15, wherein said notifying instructions forming step further comprises the step of forming instructions for sending at least one failure message to said neighboring nodes.

17. The method of claim 15, wherein said determining instructions forming step further comprises the step of forming instructions for sending a plurality of explore messages throughout said distributed telecommunications network for exploring possible alternate paths for rerouting the disrupted traffic.

18. The method of claim 15, wherein said determining instructions forming step further comprises the step of forming instructions for sending a plurality of return messages throughout said distributed telecommunications network for reporting a possible alternate path for rerouting the disrupted traffic.

19. The method of claim 15, wherein said determining instructions forming step further comprises the step of forming instructions for executing a maximum flow process for determining at least maximum flow alternate path through said distributed telecommunications network.

20. The method of claim 15, wherein said issuing instructions forming step further comprises the step of forming instructions for issuing a plurality of connect commands, said connect commands comprising a data relating to source node and a destination node together with data relating to a data path and a route of tandem nodes between said source node and said destination node.

* * * * *